United States Patent Office 2,783,152
Patented Feb. 26, 1957

2,783,152

COCONUT PRODUCT AND PROCESS THEREFOR

Charles B. de Maya, Allendale, and Adolph A. Winston, Hillside, N. J., assignors to General Foods Corporation, New York, N. Y., a corporation of Delaware No Drawing. Application June 15, 1953,
Serial No. 361,824

15 Claims. (Cl. 99—125)

This invention relates to a new coconut product having greatly improved storage characteristics and to a process for providing such a product.

The "yellowing" of coconut during storage is a major problem. Apparently, such yellowing is due to a reaction which takes place between the amino acids and reducing sugars contained in the coconut. The rate of yellowing seems to depend on the maturity of the coconut, the temperature of its storage, and the like, and although the lapse of time within which yellowing begins varies, it probably starts when the coconut is severed from the tree. The ordinary product of commerce which has been shredded and dried as soon as possible after harvesting begins to yellow 1–3 months later under usual conditions.

Heretofore $SO_2$ gas has been used in the fumigation of copra for the purpose of preventing insect and bacterial spoilage, and it has been noticed that at the high $SO_2$ level required for such fumigation, yellowing is forestalled. But the resulting $SO_2$ residuals are too high to be used in food products, being of the order of several thousand parts per million and not only raising toxicity problems, but also imparting off-flavors to the product.

By $SO_2$ residual as used herein is meant the amount of sulfur-containing compound or compounds in the product as determined by the gravimetric Monier-Williams method for $SO_2$ described in the A. O. A. C. VII, 27–51, p. 471, September 15, 1951, which is accurate to about ±20 parts per million at low levels. If a coconut product contains more than about 250 parts per million of $SO_2$ residual, it is unacceptable because of off-flavor. Some people can regularly detect $SO_2$ residuals in coconut products at levels as low as 150 parts per million, and it is therefore preferred that products which are to be distributed to the general public have a residual at the time of eating of well below about 100 parts per million.

It has now been discovered that a coconut product highly resistant to yellowing or browning can be obtained by contacting the meat of the inner surface portion of the coconut endosperm with an aqueous solution of sulfur dioxide, although said product is formed from the entire meat of the endosperm and its $SO_2$ content is only a fraction of that heretofore believed to be required for the same degree of protection. This may be accomplished in various ways. For example, it is known to scrape or shred coconut meat by means of devices inserted into the nut halves and engaging the inner surface of the meat; see U. S. Patent No. 2,633,883. Thus it is possible to separate the inner surface portion of the meat from the remainder for separate treatment with $SO_2$ and then to add this treated portion of the meat to the untreated remainder.

The same result can be accomplished more conveniently, however, by treating the endosperm before shredding, since the depth of penetration of the solution into the meat in reasonable times of treatment is very slight. Thus capped whole coconuts may simply be filled with the desired material containing sulfur dioxide, the inside surface only being treated in this case. It is more convenient, however, to break the nuts into somewhat smaller pieces; although this procedure may result in increased $SO_2$ uptake due to the additional meat surfaces exposed to the solution, still the ratio of surface area to volume is quite small as compared with shredded coconut and like products.

The $SO_2$-bearing material used to treat the nuts must be edible, i. e., non-toxic in the amounts used, and also compatible with the coconut, i. e., it must not impart objectionable off-flavors thereto. Subject to these limitations any of various materials can be used, sometimes in dry form as a powder, dust, or the like, but more often and preferably in the form of an aqueous solution at either alkaline or acidic pH's. Examples are sulfurous acid solution; solutions of alkali (including ammonium) salts of sulfurous acid, either partially or fully neutralized, such as sodium bisulfite and sodium sulfite; and the molecularly dehydrated pyrosulfites and metabisulfites such as sodium metabisulfite and potassium metabisulfite. Such compounds permit the use of a pH range of the treating solution within the range of about 2.5–9, but since relatively dilute solutions are used in practice the usual pH range will be much narrower. It will be understood that these specific compounds are only by way of example.

For convenience and because it is preferred sodium metabisulfite is referred to particularly in the following more detailed description. It is necessary to contact the coconut meat with sodium metabisulfite for a relatively short period of time only. The preferred manner of treatment is to immerse or dip the meat in a solution of the metabisulfite, although the same effects can be achieved in many ways such as by swabbing, spraying or tumbling the meat in the presence of the solution or even by spraying a dust of sodium metabisulfite on a moist coconut meat surface or simply placing a tablet of sodium metabisulfite in the coconut milk before the coconut is cracked. The dipping method is preferred because it is inexpensive and convenient and its results are most reproducible.

The concentration of the $SO_2$-containing material in the solution and the length of time the coconut meat remains in contact with the solution govern the whiteness retention of the coconut or protection against yellowing. If the concentration is too low, the contact times required to effect the desired protection are excessive, and in the case of dipping procedures water soluble materials in the coconut may be leached out. On the other hand, if the concentration is too high, the corresponding contact time is too short to permit adequate control. In the case of sodium metabisulfite, saturated solutions can be employed but are not practical because of the extreme difficulty with control, as well as the possibility of odor and the general wastefulness of the material. For practical purposes, therefore, a range of concentrations of about 0.1–3.0% by weight of metabisulfite is suitable for aqueous solutions used for contact by dipping, the preferred range being about 0.25–1.0%. Other $SO_2$-containing materials such as those mentioned above may be used in amounts capable of providing equivalent $SO_2$ concentrations, having in mind the variations in molecular weight between $H_2SO_3$, $NaHSO_3$, $Na_2SO_3$, etc.

Preferably the dipping time should be at least 1 minute, since lack of uniformity in the final product is likely to occur with very short periods. In order to provide the maximum amount of protection against yellowing with the final product having an acceptably low $SO_2$ content, the concentration of sodium metabisulfite required for a dipping time of 1 minute is about 3%. Similar results can be obtained using a 1% concentration and a dipping time of about 2 minutes; a 0.5% concentration and a dipping time of about 5 minutes; a 0.3% concentration and a dipping time of about 10 minutes; and 0.1% concentration and a dipping time of 30 minutes. The $SO_2$ residual contained in the coconut after dipping at the concentrations and for the periods of time just specified followed by thorough washing to remove excess $SO_2$ amounts to only about 100 parts per million by weight. Moreover, after shredding and desiccating to a moisture content of about 2–5%, the $SO_2$ residual falls to about 50 parts per million, and after transportation or storage for as long as three months to about 30 parts per million. This $SO_2$ residual is, of course, still further reduced by the processing involved in sugaring and remoistening the coconut for the preparation of various consumer packs.

Nevertheless the product treated in accordance with the present invention is protected against yellowing for as much as a year after leaving the desiccating plant. Without such treatment, on the other hand, the coconut is readily susceptible to yellowing, as much as one-third of any given lot being unacceptable within three months after leaving the desiccating plant and most of the remainder becoming yellow within six months.

It will be evident that if changed conditions should require greater or lesser protection against yellowing, corresponding changes can be made with respect to the concentration of the dipping solution and/or the time employed for dipping. Generally, as aforementioned, the $SO_2$ residual at the time of consumption should be less than about 100 parts per million. But if the preparation of the product for final consumption were such as to remove a substantial amount of $SO_2$, as by the use of a high temperature, a higher $SO_2$ level would be permissible in the product prior to such preparation which in turn would permit a higher $SO_2$ level to be imparted by the $SO_2$ treatment. Also, if the time required after such treatment for further processing and distribution of the product were to be increased, the $SO_2$ content of the coconut immediately after the $SO_2$ treatment should be increased in order to provide the greater amount of protection needed. In exceptional cases, therefore, the $SO_2$ content after washing may be as high as 500 parts per million.

After the coconut has been treated with sodium metabisulfite as described above or other $SO_2$-containing material, it has been found desirable to wash it. It has been discovered that washing can serve to reduce the $SO_2$ content of the coconut by as much as 50–85% without appreciably decreasing the amount of protection against yellowing afforded by the process of the present invention. Also, washing permits far greater uniformity and, therefore, much better control of the process and the amount of treatment given the coconut. Washing may, of course, be carried out in any conventional way as by dipping, spraying, and the like, the time required being determined by the desirability of removing excess $SO_2$ on the one hand, and of avoiding excessive leaching of coconut solids on the other hand. Using water jets under a pressure of about 30 lbs. per sq. in., 5 minutes washing is about optimum.

It appears that dipping the coconut in the $SO_2$-containing solution results in some of the $SO_2$ becoming combined with or tightly held by the coconut with the rest of the $SO_2$ being only loosely held or combined. The latter is that which is removed by washing but which is not responsible to any appreciable degree for the protection against yellowing afforded by the process. As an example of the desirability of washing, whole, capped coconuts were dipped in a 0.5% solution of sodium metabisulfite for about 5 minutes, and half of these only were washed with cold water jets for 5 minutes; when the entire batch of coconuts were shredded and dried, the washed half had an $SO_2$ content of about 40 parts per million whereas the other half contained about 180 parts per million. Both samples had about the same degree of whiteness retention or protection against yellowing.

In cases where the $SO_2$ treatment is applied to the whole meat of the endosperm (i. e., without first separating the inner surface portion from the remainder), the meat can be substantially undivided with excellent results being obtained. It is preferred to use capped, whole coconuts or halved coconuts because as the degree of subdivision increases for any given concentration of $SO_2$-containing material and time of dipping, $SO_2$ residuals likewise increase due to the increased surface exposed to the treatment, but the amount of protection does not increase materially. The amount of protection remains about the same even when this excess $SO_2$ is washed from the coconut, and as aforementioned prolonged unnecessary washing is undesirable because it results in loss of coconut solids, the loss reaching as high as 15–20% of the entire endosperm if ordinary coconut shreds are dipped and thoroughly washed. Evidently the treatment affects primarily the inner surface portion of the coconut meat since its effectiveness is not increased by the exposure of fresh surfaces created by subdivision. It is believed that this localization of the effect results from concentration of the reducing sugars of the coconut in the inner surface portion of the meat, probably in a very thin layer at the inside surface of the coconut. If, therefore, the coconut is subdivided to any great extent, increased surface area is exposed to the treatment and increased amounts of $SO_2$ are picked up, but no additional protection is achieved because the additional surface area exposed contains practically no reducing sugars and this excess residual should be removed by washing with the increased opportunity for losses to occur. Of course, a slight degree of subdivision or breakage is without consequence. Thus when the nuts are cut or broken into segments averaging one inch square the increase in $SO_2$ residual after dipping does not result in excessive solubility losses during washing; beyond this degree of subdivision, however, the losses during washing began to increase rapidly and soon become so large that the cost of the product removes it from the competitive market. The term "segments," as used hereinafter and in the appended claims, is to be understood to mean sections or fragments formed by dividing or breaking the nut endosperm into pieces the average size which is not materially less than about one inch square, in contradistinction to shredded coconut and the like the total surface area of which is many times greater for the same amount of coconut meat.

The process, of course, may be applied to dried coconut but such treatment will be for specialized uses because of the additional drying which would be required and the increased loss of soluble solids which would result. In addition, the process may be applied to coconut which has already begun to yellow in order to prevent further yellowing.

What is claimed is:

1. In the manufacture of comminuted coconut products, a process for treating the coconut meat to inhibit subsequent discoloration thereof which comprises contacting the meat of the inner surface portion of the nut endosperm with an aqueous sulfur-dioxide-containing solution and then forming a comminuted mixture of the treated and untreated meat of the nut endosperm whereby yellowing of the nut meat during subsequent commercial storage and distribution of said mixture is substantially prevented.

2. The process defined in claim 1, including the step of washing the coconut after the $SO_2$ treatment, thereby reducing the $SO_2$ residual in the final product.

3. The process defined in claim 1, wherein said meat of the inner surface portion of the nut is separated from the remainder and separately contacted with said aqueous solution.

4. The process defined in claim 1, wherein segments of the nut meat are contacted with said aqueous solution.

5. The process defined in claim 4, including the step of washing the segments after the $SO_2$ treatment, thereby reducing the $SO_2$ residual in the final product.

6. The process defined in claim 1, wherein said aqueous solution is contacted with the inner surface of the substantially undivided nut meat.

7. The process defined in claim 6, wherein the substantially undivided nut meats are contacted with said aqueous solution.

8. The process defined in claim 7, including the step of washing the nut meats after the $SO_2$ treatment, thereby reducing the $SO_2$ residual in the final product.

9. A process as defined in claim 1, wherein coconut in the form of substantially undivided nut meats and segments thereof is contacted with sodium metabisulfite in the presence of water.

10. A process as defined in claim 9, wherein the coconut meat is contacted with a solution of sodium metabisulfite and thereafter washed.

11. A process for preparing desiccated coconut from freshly harvested coconut in the form of substantially undivided nut meats and segments thereof which comprises contacting the coconut meat with a solution of sodium metabisulfite having a concentration of about 0.1–3.0% by weight for about 1–30 minutes, and thereafter washing, shredding, and drying the meat.

12. A process for preparing desiccated coconut from freshly harvested coconut in the form of substantially undivided nut meats and segments thereof which comprises contacting the coconut meat with a solution of sodium metabisulfite and thereafter washing, shredding, and drying the meat, the time of contact with and the concentration of the sodium metabisulfite solution being such that the coconut after washing has an $SO_2$ residual of less than about 500 parts per million.

13. A process for preparing desiccated coconut which comprises contacting the endosperm of substantially undivided, freshly harvested coconut with a solution of sodium metabisulfite having a concentration of about 0.5% by weight for about 5 minutes and thereafter washing, shredding, and drying the coconut, the $SO_2$ residual after washing being less than about 100 parts per million.

14. Edible desiccated comminuted coconut meat protected against yellowing by an $SO_2$ residual content not greater than 500 p. p. m. and characterized in that the major portion of the $SO_2$ content is concentrated in the meat of the inner surface portion of the coconut endosperm.

15. An edible coconut product in the form of dried coconut shreds containing not more than 500 p. p. m. of $SO_2$ residual but protected against yellowing by non-uniform $SO_2$ distribution obtained by treating substantially only the meat of the inner surface portion of the coconut endosperm with $SO_2$-containing material.

References Cited in the file of this patent

UNITED STATES PATENTS

| | | |
|---|---|---|
| 1,612,087 | Zucker | Dec. 28, 1926 |
| 2,338,184 | Kaufman | Jan. 4, 1944 |
| 2,506,793 | Kalmar et al. | May 9, 1950 |
| 2,592,563 | Hall et al. | Apr. 15, 1952 |
| 2,615,812 | Kaufman et al. | Oct. 28, 1952 |
| 2,628,905 | Antle et al. | Feb. 17, 1953 |